Figure 1:
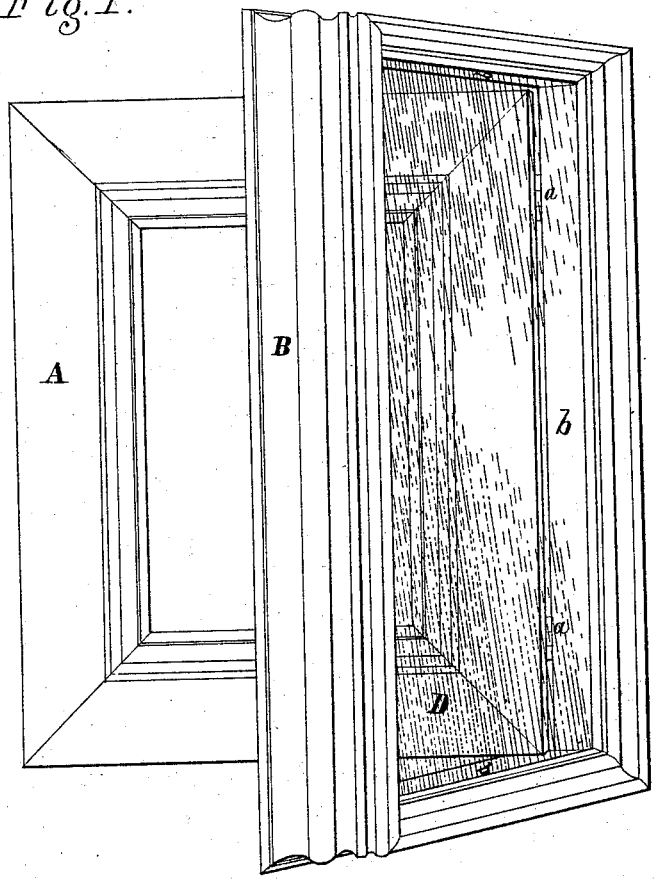

2 Sheets—Sheet 1.

F. ODENBAUGH.
PICTURE-FRAME.

No. 190,068. Patented April 24, 1877.

Attest.
B. C. Converse.
M. M. Converse.

Inventor.
Frank Odenbaugh.
By B. C. Converse
atty.

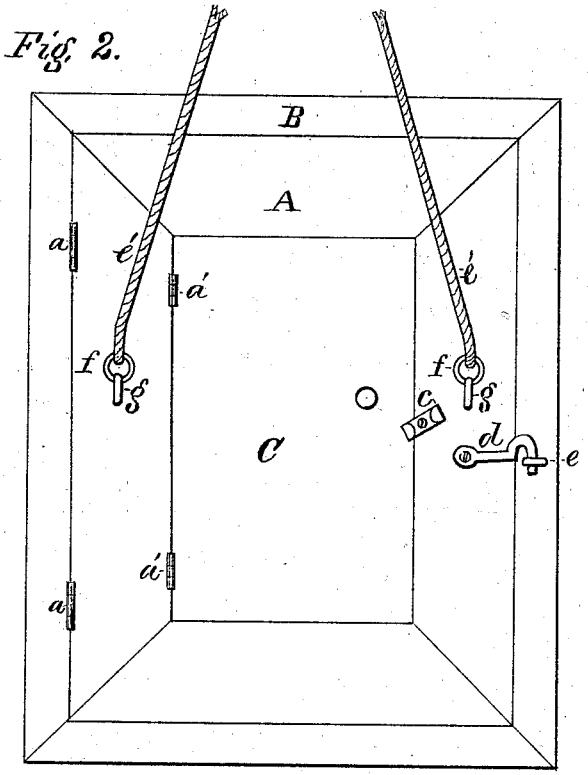

UNITED STATES PATENT OFFICE.

FRANK ODENBAUGH, OF SPRINGFIELD, OHIO.

IMPROVEMENT IN PICTURE-FRAMES.

Specification forming part of Letters Patent No. 190,068, dated April 24, 1877; application filed August 3, 1876.

*To all whom it may concern:*

Be it known that I, FRANK ODENBAUGH, of the city of Springfield, county of Clarke, and State of Ohio, have invented certain new and useful Improvements in Picture-Frames, of which the following is a specification:

My invention relates to every variety of picture-frames used for engravings, water-colored paintings, chromos, photographs, &c.; and consists in constructing the same in three parts, each hinged to the other at the back. The outside section, being the band of the frame, receives and supports the glass, which extends entirely over the frame itself, which contains the picture. The latter is hinged to it on one side, so as to shut into the rabbet or gain of the same, the object being to protect the entire frame, as well as picture, from dust, flies, &c., and to allow the frame to be thrown open when desired to clean the picture and frame. For convenience in taking out the picture, or to insert another, the back board of the frame is also hinged to the latter.

The eyebolts are not inserted in the band part, which supports the glass, as in other frams, but in the frame proper, so that the picture can remain suspended against the wall, while the band with its glass is swung out to allow the picture and its frame to be easily cleaned.

Figure 1 of the drawing is a view of my improved picture-frame opened as for cleaning a picture. Fig. 2 is a back view of the same.

A is the frame; B, the band. These are connected together by the hinges $a\ a$. When closed the whole frame (band included) presents a smooth, even surface on the back, as seen in Fig. 2, the frame A shutting into a gain or rabbet, $b$, as seen in Fig. 1. The back-board C is also hinged to the frame in the same manner and on the same side that the frame is hinged to the band. The glass D protects not only the picture, but also the frame, from either dust or flies, so that they will at all times have a bright, clean appearance.

The advantages of my improved picture-frame over that in ordinary use is apparent to every one, as in the ordinary picture-frame the nails or bands which hold the back board in must be withdrawn in order to take the picture out to clean it, and to do this the picture, with its frame and cord, must be taken down, whereas with my improved picture-frame this trouble is entirely avoided, as it can remain suspended not only to clean it, but to remove or insert the picture.

$a'\ a'$, Fig. 2, are the hinges by which the back-board C is hinged to frame A. When closed it is fastened by the small wooden button $c$, which is screwed to frame A. An ordinary latch-hook, $d$, is screwed to the frame, which hooks into an eye, $e$, on the band B, securing the two together when closed. $e'\ e'$, Fig. 2, are the ends of the cord, with rings $f\ f$ sewed in them, making a simple and ready means of attaching it to frame A by the hook-eyes $g\ g$, or releasing it therefrom when required.

I am aware that photographic frames for copying purposes, with a hinged back, have been used for printing purposes, but they form no part of my invention, and are for an entirely different object.

I disclaim a frame for exhibiting purposes, having one or more sub-frames hinged thereto, to show a card or other device in separate sectional parts thereof.

I claim as my improvement—

The inclosing band B with its glass D, frame A, and back C, having their auxiliary connecting and fastening devices upon the back thereof only, the said band B adapted to be operated independently of frame A (to which it is hinged) when the latter is suspended by cord $e'$, substantially as described and set forth.

FRANK ODENBAUGH.

Attest:
 B. C. CONVERSE,
 H. H. PRUGH.